United States Patent Office 2,861,973
Patented Nov. 25, 1958

2,861,973

MOLDABLE SLURRY COMPRISING VINYL BUTYRATE AND POLYETHYL METHACRYLATE AND MOLDING OBTAINED THEREFROM

Harry Wechsler, Fitchburg Mass., assignor to The Borden Company, New York, N. Y., a corporation of New Jersey No Drawing. Application January 31, 1956
Serial No. 562,594

4 Claims. (Cl. 260—45.5)

This invention relates to improved synthetic plastic materials suitable for caulking and molding. In particular it relates to novel, inexpensive, fast-setting synthetic plastic materials useful in readily molding clear products with selective flexibility.

One object of this invention is to provide a synthetic plastic material which can be used as an inexpensive caulking and molding compound.

A further object of this invention is to provide a moldable synthetic plastic material which is easily processed and fast-setting, and which yields, upon cure, clear flexible products of low cost. Other objects will be apparent from the description which follows and the appended claims.

In certain instances, when a powdered polymer is mixed with its own liquid monomer, a slurry is formed which thickens gradually on standing. If, when the mass reaches a doughy consistency it is pressed into a mold and the mold then closed and the cycle completed under heat and pressure, cured moldings will result. Compared to conventional casting of liquid monomer or of polymer-thickened monomer (syrup), it is easier to control temperature and reduce shrinkage. The chief applications of this slurry molding procedure have been made in the molding of arcylic teeth, acrylic dentures and decorative plastic articles.

However, moldable slurries or doughs have been usually limited in the past to all-methacrylate monomer-polymer slurries, e. g. methyl methacrylate with polymethyl methacrylate. Even these are difficult to use in forming flexible clear products without the use of plasticizers. In fact, most mixtures of common monomers with their polymers, e. g. polystyrene-styrene, polyvinylacetate-vinylacetate, do not yield doughs at all but rather syrups unsuitable for molding.

It has been found, in accordance with this invention, that a liquid vinyl butyrate monomer when mixed at room temperature in the presence of a catalyst with a finely powdered polymer of ethyl methacrylate provides a slurry which can be rapidly converted to a moldable dough. The molded product after heating under pressure is clear and flexible. The required catalyst, e. g. benzoyl peroxide, may be dissolved in the monomer or found in the polymer.

The powdered polymer is preferably of a molecular weight range of 100,000–1,000,000, as determined in 0.5 percent ethylene-dichloride solution where the molecular weight is calculated from the following formula:

$$M. W. = 380,000 [\eta]^{1.3}$$

and $[\eta]$ = intrinsic viscosity = 2.18 $1n$ (relative viscosity)—0.025.

The proportions of monomer to polymer can be varied widely according to the desired flexibility of the end product. It is preferred, however, that the mixture comprise 20–80 percent monomer and 80–20 percent polymer.

Thus, liquid vinyl butyrate monomer mixed with powdered 300,000 molecular weight polyethylmethacrylate yields clear, flexible strong films and moldings. When used as a caulking compound for glass, wood, metal or tile it is found easy to apply, quick-to-set, low-shrinking, flexible, clear, adherent and smooth surfaced when applied with a smooth blade.

A specific formulation is given below to illustrate this invention. In this case a two inch disc of about ⅛" thickness was molded from the dough in a laboratory hydraulic press by heating for 30 minutes at 100° C. under 100 p. s. i. pressure; and caulking done with a spatula onto ceramic tiles and glass tiles set in panels at 25° C.

0.1 gm. of benzoyl peroxide were dissolved in 5 gms. of distilled vinyl butyrate. To this liquid was added with mixing 6 gms. of 300,000 M. W. polyethylmethacrylate. The liquid mixture converted to a moldable dough in about two minutes. A portion was molded into a disc and a portion caulked as above. The disc was clear, flexible and tough. It retained its flexibility after being heated overnight in an oven at 100° C. The caulkings were set in 5 to 10 minutes and after a week were smooth, clear, low shrinking and fully adherent.

The addition of benzoyl peroxide to the powder or the liquid is for the purpose of accelerating the setting and curing time, which is ordinarily slow in the absence of a peroxide or other catalyst. Any of several peroxides known to those conversant with the art can be used in place of benzoyl peroxide, such as lauroyl peroxide, dichlorobenzoyl peroxide, diacetyl peroxide, and others. Polymerization activators can also be added, such as toluene sulfinic acid, p-toluidine, etc., as are often used in the polymerization of various monomers.

I claim:

1. A hardenable, moldable fluid mixture comprising liquid vinyl butyrate monomer and powdered polyethyl methacrylate.

2. The mixture of claim 1, wherein 20 to 80% thereof is liquid vinyl butyrate monomer and 80 to 20% is powdered polyethyl methacrylate.

3. A molding comprising the hardened reaction product of a fluid mixture comprising liquid vinyl butyrate and powdered polyethyl methacrylate.

4. A molding of claim 3, wherein the fluid mixture comprises 20 to 80% liquid vinyl butyrate monomer and 80 to 20% powdered polyethyl methacrylate.

References Cited in the file of this patent

UNITED STATES PATENTS

| | | |
|---|---|---|
| 2,321,048 | Schildknecht | June 8, 1943 |
| 2,569,767 | Knock | Oct. 2, 1951 |
| 2,666,042 | Nozaki | Jan. 12, 1954 |

FOREIGN PATENTS

| | | |
|---|---|---|
| 679,562 | Great Britain | Sept. 17, 1952 |
| 764,300 | Great Britain | Dec. 28, 1956 |